US007048391B2

(12) United States Patent
Greves

(10) Patent No.: US 7,048,391 B2
(45) Date of Patent: May 23, 2006

(54) PERSONAL REFLECTOR

(76) Inventor: Kenneth J. Greves, 719 Bielby Rd., Lawrenceburg, IN (US) 47025

( * ) Notice: Subject to any disclaimer, the term of this patent is extended or adjusted under 35 U.S.C. 154(b) by 0 days.

(21) Appl. No.: 10/016,468

(22) Filed: Dec. 10, 2001

(65) Prior Publication Data

US 2003/0107810 A1 Jun. 12, 2003

(51) Int. Cl.
*G02B 5/12* (2006.01)

(52) U.S. Cl. ...................................... 359/516; 359/840

(58) Field of Classification Search ................ 359/840, 359/515–519; 40/1.5; 132/316
See application file for complete search history.

(56) References Cited

U.S. PATENT DOCUMENTS

| | | | | | |
|---|---|---|---|---|---|
| 2,004,181 | A | * | 6/1935 | Arbuckle et al. | 40/208 |
| 2,062,646 | A | * | 12/1936 | Fox | 359/840 |
| 2,078,103 | A | | 4/1937 | Simmons | |
| 2,123,478 | A | | 7/1938 | Smith | 88/80 |
| 2,389,234 | A | * | 11/1945 | Harrison | 40/583 |
| 2,610,548 | A | | 9/1952 | Isenberg | 88/78 |
| 2,737,851 | A | | 3/1956 | Buchholtz | 88/80 |
| 2,898,878 | A | | 8/1959 | Reinholdt | 116/28 |
| 3,335,693 | A | * | 8/1967 | Murray, Jr. | 116/20 |
| 3,381,307 | A | | 5/1968 | Shingler | |
| 3,580,659 | A | | 5/1971 | Fukushima | 350/98 |
| 3,707,319 | A | | 12/1972 | Pawsat et al. | 350/97 |
| 3,837,007 | A | | 9/1974 | Girest | 2/93 |
| 3,950,076 | A | * | 4/1976 | Carlson | 359/519 |
| 4,365,798 | A | * | 12/1982 | Shields et al. | 359/840 |
| 4,443,056 | A | * | 4/1984 | Sullivan | 359/519 |
| 4,600,269 | A | * | 7/1986 | Rass | 359/519 |
| 4,648,189 | A | * | 3/1987 | Michel | 40/546 |
| 5,193,026 | A | | 3/1993 | Purvis et al. | 359/516 |
| 5,483,917 | A | | 1/1996 | Walker | 116/63 |
| D366,947 | S | | 2/1996 | Brown | D26/37 |
| D369,568 | S | | 5/1996 | Sloot | D10/111 |
| 5,588,154 | A | * | 12/1996 | Blauer et al. | 2/69 |
| 5,613,756 | A | | 3/1997 | Allen | 362/103 |
| D380,566 | S | | 7/1997 | Chen | D26/37 |
| 5,664,256 | A | | 9/1997 | Blauer et al. | 2/69 |
| 5,677,790 | A | * | 10/1997 | Taglieri | 359/515 |
| D392,403 | S | | 3/1998 | Benensohn | D26/39 |
| 5,777,810 | A | * | 7/1998 | Murray, Jr. | 359/883 |
| D416,639 | S | | 11/1999 | Anwyl-Davies | D26/37 |
| 6,015,217 | A | | 1/2000 | Colangelo et al. | 362/103 |
| 6,142,640 | A | * | 11/2000 | Schofield | 359/838 |
| 6,193,385 | B1 | | 2/2001 | Maki et al. | 362/108 |

* cited by examiner

*Primary Examiner*—Euncha P. Cherry
(74) *Attorney, Agent, or Firm*—Wood, Herron & Evans, L.L.P.

(57) ABSTRACT

An apparatus comprises a structure having first and second opposite reflective sides and adapted to be removably attached to clothing. A method for signaling the presence of a user comprises providing a structure having first and second opposite reflective sides being adapted to removably attach to clothing, removably attaching the structure to clothes worn by the user and reflecting light from the structure.

57 Claims, 1 Drawing Sheet

PERSONAL REFLECTOR

FIELD OF THE INVENTION

The present invention relates to light reflecting devices, and more particularly, to personal reflectors adapted for use in a vehicular environment.

BACKGROUND OF THE INVENTION

Low-light conditions can pose serious risk of injury to persons standing or working near roadways. Such dangers are of particular concern to construction, law enforcement and other emergency personnel who must routinely hazard traffic as part of their duties. Consequently, efforts have been made to apprize motorists of the presence of such persons, as well as that of bikers, joggers and other recreation-minded persons. For instance, stationary warning lights, signs or flares may alert oncoming motorists of a construction zone or accident scene. However, such fixtures provide little protection for workers who must stray outside the designated area.

Conventional portable warning devices have proven impractical or inconvenient in that they must be carried in a hand of the user, thus limiting the tasks able to be performed by the user. Still others require users to carefully orient reflective faces of the devices prior to attaching them to clothing with cumbersome clasps or hooks. Such requirements and attachments may dissuade persons from using them, and further render the devices vulnerable to breakage. Consequently, there exists a need for a personal portable reflective warning device which does not require conscious orientation of the reflective surface thereof and which frees the hands of a user to perform tasks other than carrying the device.

SUMMARY OF THE INVENTION

The present invention includes both a reflective apparatus and methods for its use. The apparatus comprises a structure having first and second opposite sides and adapted to be removably attached to clothing. The first and second sides are reflective.

Preferably the structure is adapted to fit within a pocket of a user. For instance, the structure may be adapted to fit within a shirt or pants pocket. The structure is preferably adapted to protrude out of the pocket when seated in the pocket of the user. The structure is preferably substantially oblong, planar and rectangular. As such, the structure may preferably be 13 inches long by 2 inches wide by 0.25 inches thick. The corners of the structure are preferably rounded, having about 0.25 inch radius.

The apparatus may further include reflective material attached to the opposite sides.

The apparatus preferably has at least one recessed area in the sides to accommodate the reflective material. For instance, the structure may include three recessed areas, each area being 3.6 inches long by 2.1 inches wide by 0.2 inches thick.

The apparatus may further include at least one aperture facilitating alternative means of attaching the device to a user.

The present invention further comprises a method for signaling the presence of a user, comprising providing a structure having first and second opposite reflective sides being adapted to removably attach to clothing, removably attaching the structure to clothes worn by the user and reflecting light from the structure.

The method further may include configuring the structure to fit within a pocket of a user, such as a shirt pocket or pants pocket. The method preferably adapts the structure to protrude out of the pocket when seated in the pocket of the user.

The method preferably calls for manufacturing the structure to be substantially oblong, planar and rectangular.

Preferably, reflective material is attached to the sides. At least one area of the structure may be recessed to accommodate the reflective material, which may include reflective tape.

As such, the present invention provides a number of advantages. First, due to its geometry, users may readily display the apparatus in a belt or pocket to alert oncoming traffic of their immediate presence while performing their duties. Both hands of the user are therefore free to perform tasks as required.

Second, the ease of use of the apparatus will promote its use and consequently increase public safety by raising the awareness of passing motorists to pedestrians. Such ease of use stems from the fact that the device requires no complicated or time consuming orientation/re-orientation as both sides/ends are reflective, thus insuring that a reflective side/end is always visible.

The above and other advantages of the present invention shall be made apparent from the accompanying drawings and the description thereof.

BRIEF DESCRIPTION OF THE DRAWINGS OF THE INVENTION

DETAILED DESCRIPTION OF PREFERRED EMBODIMENTS OF THE INVENTION

Figure 1:
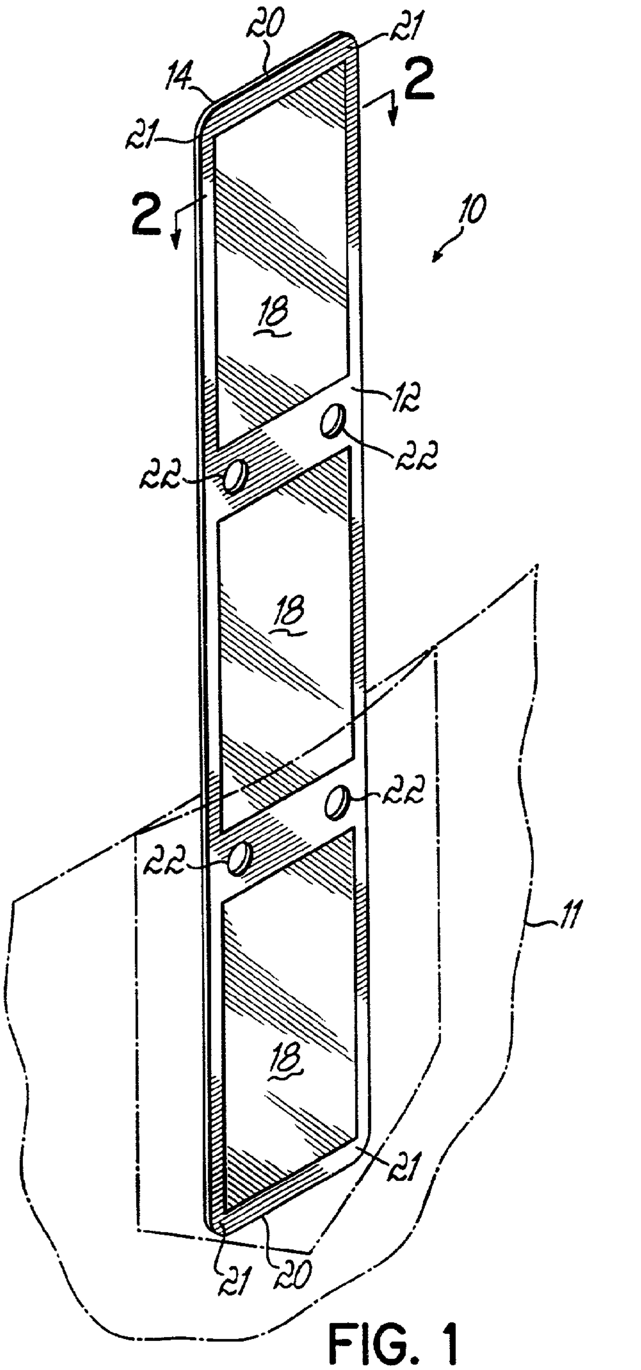
FIG. 1 is a plan view of a reflector device consistent with the principles of the present invention.
Figure 2:
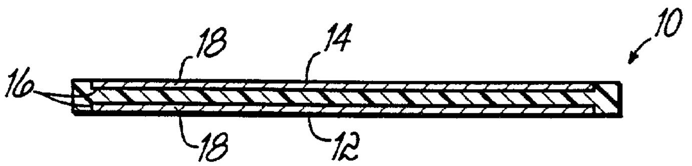
FIG. 2 is a cross-sectional view taken along line 2—2 of FIG. 1.

Referring to FIGS. 1 and 2, a reflector device 10 according to the principles of the present invention is preferably planar and rectangular, having preferable dimensions approximating: 13 inches long×2.5 inches wide×0.1 inch thick. Each side 12, 14 of the device 10 preferably includes at least one recess 16 configured to receive a section of reflective material 18. More particularly, FIGS. 1 and 2 illustrate a preferred embodiment of the device 10 having three molded, etched, or otherwise cut-out rectangular recesses 16 on each side 12, 14. As illustrated in both FIGS. 1 and 2, the depth of each recess 16 preferably corresponds to or approximates the 0.02 inch thickness of the reflective material 18. As such, reflective material 18, such as 3M reflective tape, may adhere to the recessed portions 16 of the reflector device 10 so as to leave a relatively smooth, even and continuous surface. This seamless feature may prevent the device 10 from snagging on clothing as it is inserted into or removed from clothing.

The construct of the device 10 facilitates ease of storage and display of the device 10. The dimensions and materials comprising the reflector device 10 enable an individual to display it from within a pocket when in use. More specifically, the relatively narrow proportions of the device 10 enable a user to insert it info a conventional pocket such that a portion of the reflective device 10 protrudes from the pocket 11 as shown in phantom lines in FIG. 1. The rounded, or ¼ inch radiused corners 21 of the device 10 further make it easy for a wearer to slip it into the pocket 11. Further, because both ends 20 of the device 10 include reflective material 18, the user may attach or otherwise position the device 10 without regard to end-to-end orientation.

By the same token, because both sides 12, 14 of the device 10 include reflective material 18, the user may attach or otherwise position the device 10 without regard to side-to-side orientation. This relatively carefree feature prevents the device 10 from distracting emergency personnel and other users during deployment thereof and encourages the formation of habitual use. In similar fashion, a biker or stranded motorist may display the reflector device 10 in or beneath a belt or pocket to alert oncoming traffic of their presence. In any application, the ease of use and accessibility of the reflector device will save lives by raising the awareness passing motorists.

Furthermore, the flexible nature of the plastic forming the device 10 allows the user to move about in an unrestricted manner without regard for the device 10 or inconvenience to the wearer. Of note, the reflective device 10 is preferably molded from a general purpose black copolymer polypropylene resin. As such, the plastic conforms to the movement of the wearer while maintaining its structural integrity even as a user sits, squats or bends. Further, the pliable characteristics of the device 10 prevent it from poking or gouging the user or otherwise inhibiting motion.

As shown in FIG. 1, the device 10 may further incorporate small apertures 22 formed or drilled to accommodate lanyards or other attachment devices. Of note, FIG. 1 shows four such apertures 22, two between each recessed portion 16. As such, a jogger or fisherman may display the device 10 by tethering it to a string of a jacket.

When stored, the substantially planar properties of the device 10 allow users to store it virtually anywhere, to include a glove compartment, backpack and jacket liner.

While the present invention has been illustrated by a description of various embodiments, and while these embodiments have been described in considerable detail, it is not the intention of the applicant to restrict, or in any way limit, the scope of the appended claims to such detail. For instance, the structure of the reflector device 10, itself, may be manufactured from reflective construct, obviating the need for attachment processes. Additional advantages and modifications will readily appear to those skilled in the art. The invention in its broader aspects is therefore not limited to the specific details, representative apparatus and method, and illustrative example shown and described. Accordingly,

The invention claimed is:

1. An apparatus, comprising:

a pliable, resilient structure having a first set of opposite ends substantially symmetrical about a first axis and a second set of opposite ends substantially symmetrical about a second axis that is perpendicular to the first axis, wherein the structure further includes first and second opposite sides, the structure being adapted to be inserted into a pocket of clothing worn by a user, wherein said first and second sides are reflective, and said structure seats free of a fastener within the pocket, said structure being further adapted to be inserted into the pocket of clothing, and to reflect light, no matter which side or which end protrudes from the pocket.

2. The apparatus of claim 1, where said structure includes at least one aperture.

3. The apparatus of claim 1, wherein said structure is adapted to fit within a shirt pocket of a user.

4. The apparatus of claim 1, wherein said structure is adapted to fit within a pants pocket of a user.

5. The apparatus of claim 1, wherein said structure is adapted to protrude out of the pocket when seated in the pocket of the user.

6. The apparatus of claim 1, wherein said structure is substantially oblong.

7. The apparatus of claim 1, wherein said structure is substantially planar.

8. The apparatus of claim 1, wherein said structure is substantially rectangular.

9. The apparatus of claim 1, wherein said structure is 13 inches long×2.5 inches wide.

10. The apparatus of claim 1, wherein said structure is 0.25 inches thick.

11. The apparatus of claim 1, wherein said structure is manufactured from reflective material.

12. The apparatus of claim 1, wherein reflective material is attached to said sides.

13. The apparatus of claim 12, wherein said reflective material is reflective tape.

14. The apparatus of claim 12, wherein said structure includes at least one recessed area in said sides to accommodate said reflective material.

15. The apparatus of claim 14, wherein said recessed area is 3.6 inches long and 2.1 inches wide and 0.2 inches deep.

16. The apparatus of claim 14, wherein said structure includes three said recessed areas in each of said sides.

17. The apparatus of claim 16, wherein said structure includes a pair of apertures between adjacent said recessed areas.

18. The apparatus of claim 1, wherein said structure includes radiused corners.

19. The apparatus of claim 18, wherein said radius is 0.25 inch.

20. A method for signaling the presence of a user, comprising:

providing a pliable, resilient structure having a first set of opposite ends substantially symmetrical about a first axis and a second set of opposite ends substantially symmetrical about a second axis that is perpendicular to the first axis, wherein the structure further includes first and second opposite sides, the structure being adapted to be inserted into a pocket of clothing worn by a user, said first and second sides being reflective, wherein said structure is configured to seat free of a fastener within the pocket;

inserting said structure into a pocket of clothing worn by the user without regard to which side or which end protrudes from the pocket; and reflecting light with said structure.

21. The method of claim 20, further comprising configuring said structure to fit within a shirt pocket of a user.

22. The method of claim 20, further comprising configuring said structure to fit within a pants pocket of a user.

23. The method of claim 20, further comprising adapting said structure to protrude out of the pocket when seated in the pocket of the user.

24. The method of claim 20, further comprising constructing said structure from reflective material.

25. The method of claim 20, further comprising manufacturing said structure from flexible material.

26. The method of claim 20, further comprising manufacturing said structure to be substantially oblong.

27. The method of claim 20, further comprising manufacturing said structure to be substantially rectangular.

28. The method of claim 20, further comprising manufacturing said structure to be 13 inches long and 2.5 inches wide.

29. The method of claim 20, further comprising manufacturing said structure to be 0.25 inches thick.

30. The method of claim 20, further comprising attaching reflective material to said sides.

31. The method of claim 30, further comprising recessing at least one area of said structure to accommodate said reflective material.

32. The method of claim 31, wherein said area is 3.6 inches long×2.5 inches wide×0.2 inches thick.

33. The method of claim 31, further comprising recessing three of said areas in each of said sides.

34. The method of claim 30, further comprising recessing said structure to accommodate reflective tape.

35. The method of claim 20, further comprising including an aperture in said structure.

36. The method of claim 33, further comprising including a pair of apertures between adjacent said areas.

37. The method of claim 20, further comprising radiusing each corner of said structure.

38. The method of claim 37, wherein the radius of each said corner is 0.25 inches.

39. An apparatus, comprising:

a semi-rigid and pliable, resilient structure having a first set of opposite ends substantially symmetrical about a first axis and a second set of opposite ends substantially symmetrical about a second axis that is perpendicular to the first axis, wherein the structure further includes first and second opposite sides, the structure being adapted to be inserted into a pocket of a user, wherein said first and second sides are reflective, and said structure seats free of a fastener within the pocket wherein said structure is further adapted to reflect light no matter which side or which end protrudes from the pocket.

40. The apparatus of claim 39 wherein said structure is adapted to fit within a shirt pocket of a user.

41. The apparatus of claim 39, wherein said structure is adapted to fit within a pants pocket of a user.

42. The apparatus of claim 39, wherein said structure is adapted to protrude out of the pocket when seated in the pocket of the user.

43. The apparatus of claim 39, wherein said structure is substantially oblong.

44. The apparatus of claim 39, wherein said structure is substantially planar.

45. The apparatus of claim 39, wherein said structure is substantially rectangular.

46. The apparatus of claim 39, wherein said structure is 13inches long×2.5 inches wide.

47. The apparatus of claim 39, wherein said structure is 0.25inches thick.

48. The apparatus of claim 39, wherein said structure is manufactured from reflective material.

49. The apparatus of claim 39, wherein reflective material is attached to said sides.

50. The apparatus of claim 49, wherein said reflective material is reflective tape.

51. The apparatus of claim 49, wherein said structure includes at least one recessed area in said sides to accommodate said reflective material.

52. The apparatus of claim 51, wherein said recessed area is 3.6 inches long and 2.1 inches wide and 0.2 inches deep.

53. The apparatus of claim 51, wherein said structure includes three said recessed areas in each of said sides.

54. The apparatus of claim 39, where said structure includes at least one aperture.

55. The apparatus of claim 51, wherein said structure includes a pair of apertures between adjacent said recessed areas.

56. The apparatus of claim 39, wherein said structure includes radiused corners.

57. The apparatus of claim 39, wherein said radius is 0.25 inch.

* * * * *

UNITED STATES PATENT AND TRADEMARK OFFICE

CERTIFICATE OF CORRECTION

PATENT NO. : 7,048,391 B2

APPLICATION NO. : 10/016468
DATED : May 23, 2006
INVENTOR(S) : Kenneth J. Greves It is certified that error appears in the above-identified patent and that said Letters Patent is hereby corrected as shown below:

Column 2 line 64, change the word "info" to --into--.

Column 3 line 47, after the word "Accordingly,", insert --departures may be made from such details without departing from the spirit or scope of the applicant's general inventive concept.--

Signed and Sealed this

Twenty-ninth Day of August, 2006

JON W. DUDAS
*Director of the United States Patent and Trademark Office*